(12) United States Patent
Maki-Haapoja

(10) Patent No.: US 9,415,424 B2
(45) Date of Patent: Aug. 16, 2016

(54) APPARATUS AND SYSTEM OF A SORTER AND METHOD FOR SORTING WOOD PIECES

(71) Applicant: Reikalevy Oy, Yliharma (FI)

(72) Inventor: Matti Maki-Haapoja, Yliharma (FI)

(73) Assignee: REIKALEVY OY, Yliharma (FI)

( * ) Notice: Subject to any disclaimer, the term of this patent is extended or adjusted under 35 U.S.C. 154(b) by 209 days.

(21) Appl. No.: 13/787,688

(22) Filed: Mar. 6, 2013

(65) Prior Publication Data

US 2013/0233774 A1    Sep. 12, 2013

(30) Foreign Application Priority Data

Mar. 8, 2012    (FI) .................................... 20125246

(51) Int. Cl.
*B07C 5/14*    (2006.01)
*B07C 5/02*    (2006.01)
*B65G 47/14*    (2006.01)
*B65G 47/88*    (2006.01)

(52) U.S. Cl.
CPC ... *B07C 5/14* (2013.01); *B07C 5/02* (2013.01); *B65G 47/1478* (2013.01); *B65G 47/8823* (2013.01); *B65G 2201/0282* (2013.01)

(58) Field of Classification Search
CPC .......... B07C 5/14; G01N 33/46; B27B 31/00; B27B 31/08; B65G 2201/0282; B65G 47/1471
USPC .......... 209/517–521; 414/745.9, 746.1, 746.2
See application file for complete search history.

(56) References Cited

U.S. PATENT DOCUMENTS

| 3,116,835 | A | * | 1/1964 | Brandon | ................... B07C 5/14 209/520 |
| 3,554,249 | A | * | 1/1971 | Arnelo et al. | ................. 144/357 |
| 3,700,116 | A | | 10/1972 | Rysti | |
| 4,204,798 | A | * | 5/1980 | Warren et al. | ................... 83/367 |
| 4,628,781 | A | * | 12/1986 | Rowley | ........................... 83/371 |
| 5,119,930 | A | | 6/1992 | Stelter | |
| 2002/0158078 | A1 | * | 10/2002 | Goater | .......................... 221/254 |
| 2008/0197054 | A1 | * | 8/2008 | Lindstrom | ............. G01B 17/06 209/517 |

FOREIGN PATENT DOCUMENTS

| CA | 2089780 | 8/1994 |
| DE | 8914877 | 2/1990 |

OTHER PUBLICATIONS

European Search Report for EP 13157410.5 filed Mar. 6, 2013, Applicant: Reikalevy O, Date of Mailing: Jun. 13, 2014, 4 pages.

* cited by examiner

*Primary Examiner* — Joseph C Rodriguez
*Assistant Examiner* — Kalyanavenkateshware Kumar
(74) *Attorney, Agent, or Firm* — Perkins Coie LLP

(57) ABSTRACT

The present disclosure relates to a system and method of a sorter and a method for sorting wood pieces and for guiding them to a conveyor. This type of sorter comprises a lower frame, a receiving deck for wood pieces, and a feeder for detaching a wood piece from the receiving deck. Said feeder comprises a controller for supporting the wood piece during movement directed to it and transferring it substantially vertically from the receiving deck. In that case the control means is traversed by at least two bearers controlled by an actuator for producing the vertical movement of the wood piece. The bearers are arranged to project from an outer surface of the controller by an amount of projection that is adjustable during lifting. The feeder further comprises a measuring unit for detecting a wood piece of a given diameter (e.g., the largest or larger cross-sectional diameter) on the bearers and for controlling the projection of the bearers to a position corresponding to this given diameter.

19 Claims, 5 Drawing Sheets

APPARATUS AND SYSTEM OF A SORTER AND METHOD FOR SORTING WOOD PIECES

CROSS-REFERENCE TO RELATED APPLICATION(S)

This application claims the benefit of Finnish Patent Application No. 20125246 entitled "SORTER AND METHOD FOR SORTING WOOD PIECES", filed on Mar. 8, 2012, the contents of which are incorporated herein by reference.

BACKGROUND

Handling of raw timber in large batches in particular is often problematic due to different diameters, lengths and curvatures of logs. Raw timber brought in bundles to the feeder deck by a tractor or a front loader needs to be sorted and forwarded quickly and reliably for further handling. Conventionally, this type of work has been carried out using different kinds of step feeders. Depending on the implementation, these are, however, either large, slow and expensive or complicated and require a lot of servicing. Moreover, it is hard to find equipment that would be suitable as such for sorting logs to be fed to a log splitter.

BRIEF DESCRIPTION OF THE DRAWINGS

In the following, some embodiments of the disclosure are explained in closer detail with reference to the accompanying drawings, in which.

DETAILED DESCRIPTION

Figure 1:
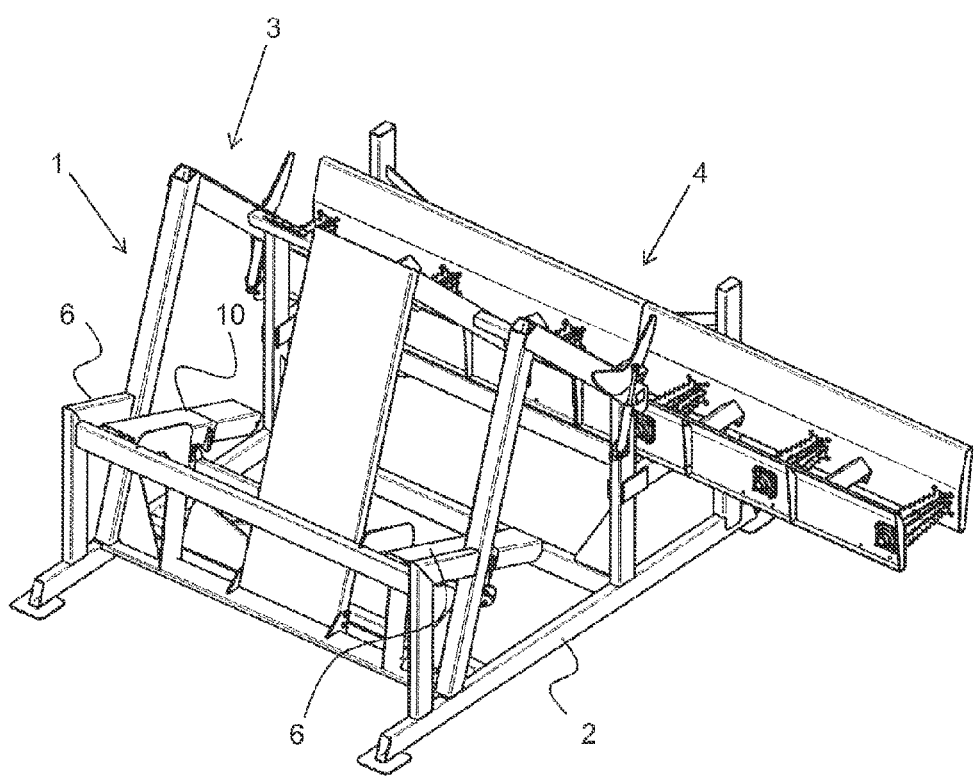
FIG. 1 shows the disclosed sorter with the associated storage decks and roller conveyors as an axonometric front view diagonally from above.
Figure 2:
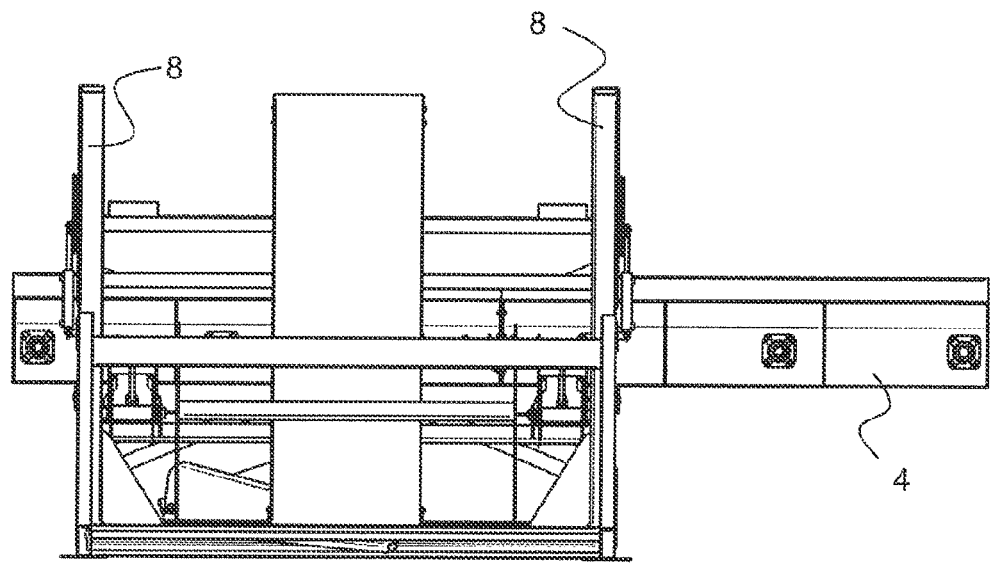
FIG. 2 shows the sorter of FIG. 1 with its storage decks and roller conveyors face forward.

It is thus an object of the present disclosure to remove drawbacks of the prior art and to provide a solution for a sorter structure and operation.

This can be achieved by a sorter and a method for sorting wood pieces having the characteristics as described in the present disclosure.

The disclosure is, in one embodiment, based on an idea to measure the diameter of wood pieces during sorting to render the sorting more reliable and yet allow logs to be sorted better than before for further use. When the disclosed sorter is combined with a wood splitter or splitters, wood pieces of various diameters can be handled without a need to restrict their maximum or minimum diameter.

The terms "above", "below", and so forth used in the specification illustrate the features of the disclosure in the directions that are relative to the sorter of the disclosure as presented in the attached figures.

The disclosure provides considerable advantages. Consequently, the handling of wood pieces guided from the feeder deck to the sorter becomes easier because the apparatus mainly operates automatically and independently, thus allowing staff resources to be released for other duties, which in turn improves work productivity. When the disclosed sorter is combined with a wood splitter or splitters, for example, a single machine operator is capable of managing an entire production line of wood splitting.

Measuring the diameter of wood pieces allows them to be guided better than before to the most suitable machine for further handling. For example, when wood is to be split, wood pieces of different diameters may be guided to wood splitters provided with different splitter wedges.

Other advantages of the disclosure are presented in the following in connection with a more detailed description of embodiments of the disclosure.

In the disclosed figures the sorter and the method for sorting wood pieces are not shown in scale but the figures are schematic, illustrating an embodiment of the disclosed structure and operation. The structural parts indicated by reference numerals in the figures thus correspond to the structural parts marked with reference numerals in this specification.

FIG. 1 is a schematic view of a sorter 1 arranged to stand on a base supported by its lower frame 2. In this embodiment the same lower frame is also provided with a storage deck 3 and a conveyor means 4. The structure and operation of these may naturally differ from those disclosed here, this having no effect on the structure or operation of the sorter. The above-mentioned base may be a concrete floor or asphalt, or any other mineral platform suitable for this purpose. When necessary, the lower frame may be locked to the base by ground anchors known per se, these being not separately shown here.

The lower frame 2 supports a superimposed receiving deck 6 for wood pieces 5, onto which the wood pieces are fed or roll from an adjacent feeder deck that is not separately disclosed either. The receiving deck is arranged adjacent to a feeder 7 used for separating the wood pieces one by one from the receiving deck and for guiding them for further handling. The receiving deck thus provides the apparatus with a part substantially projecting from an outer surface of a control means 8 provided in the feeder, the receiving deck edge on the side of the control means being preferably arranged to be lower, i.e., closer to the base, than its edge facing the control means and being closer to the feeder deck. Wood pieces falling from the feeder deck to the receiving deck thus mostly roll by force of gravity along an upper surface 9 of the receiving deck to the feeder.

The feeder 7 is used for lifting the wood pieces 5 in a substantially vertical direction to the storage deck 3 or conveyor attached to the sorter 1 and higher up in relation to the base than the receiving deck 6. When the separated wood pieces have been fed to the storage deck, they are guided for further handling to a saw, splitter or similar device by a specific conveyor means 4, which may form an integral part of the disclosed sorter or be attached thereto as a separate device. Separated wood pieces fed by the conveyor may even be guided with it directly for further handling.

Figure 4:
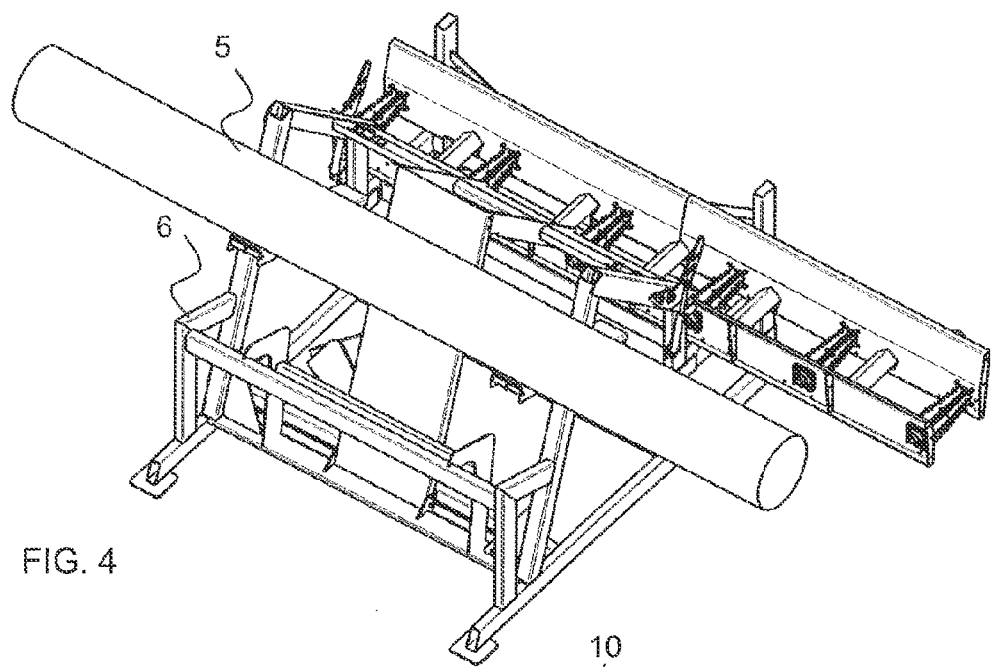
FIG. 4 shows the sorter of FIG. 1 lifting a wood piece.
Figure 5:
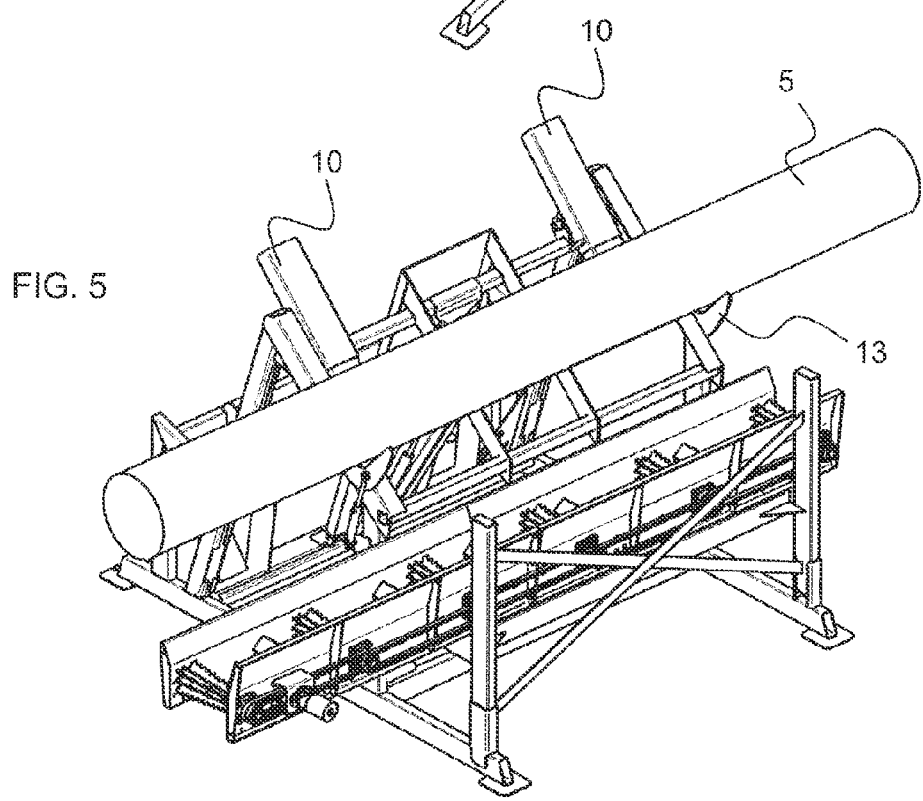
FIG. 5 shows a wood piece lowered against feeder means provided on a storage deck.

The conveyor means 4 may be formed of a roller conveyor of FIGS. 4 and 5, for example, or it may be any mat, flange or a similar conveyor known per se.

Figure 3:
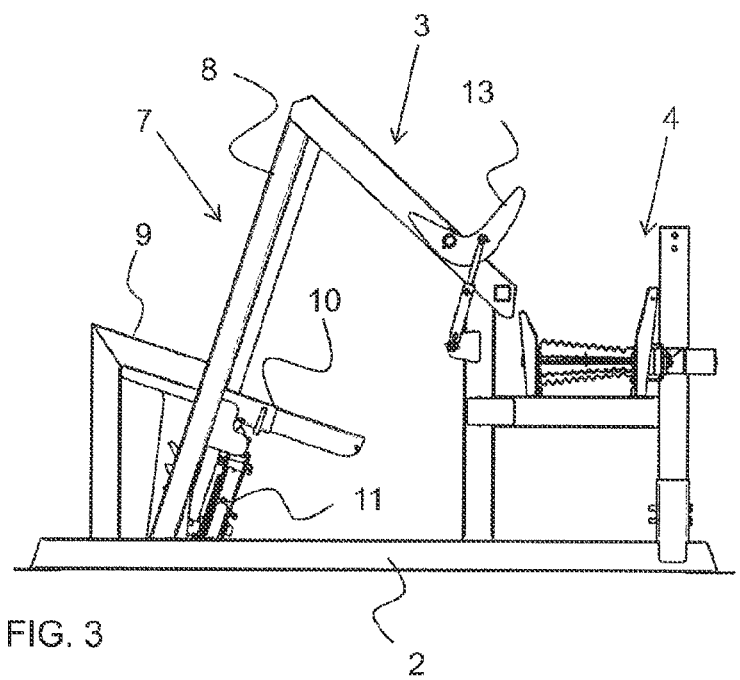
FIG. 3 shows the sorter of FIG. 1 with its storage decks and roller conveyors in direct profile.

A wood piece 5 that has rolled to the receiving deck 6 is guided by a specific feeder 7 to the storage deck 3 located higher up. This type of device comprises the above-mentioned control means 8 for supporting the wood piece during a movement directed to it and transferring it in a substantially vertical direction from the receiving deck. The support is provided by an outer surface formed to the control means. In this specific embodiment the control means comprise at least two substantially adjacent runners that may be made of tubular beams, for example. In that case the side surface decks of the runners form part of said outer surface. The control means may also be flat pieces or, as shown in FIGS. 1, 3 and 5, for example, a combination of tubular beams and plates.

To facilitate the conveyance of the wood piece 5, the outer surface of the control means 8 is preferably arranged at an angle in relation to a vertical deck, as shown in the figures, the outer surface thus forming an angle diverting from the receiving deck in relation to the vertical deck. The angle between the vertical deck and the outer surface is 10 to 30 degrees. The smoothest path and best separation of the wood pieces is achieved when the angle is 15 to 20 degrees.

The wood piece 5 on the receiving deck 6 is taken by at least two specific bearers 10 arranged under the wood piece. These bearers preferably traverse the outer surface of the control means 8, or an imaginary outer surface formed by the control means, and enter the area defined by the receiving deck. In that case the bearers preferably form a right angle with the outer surface of the control means, fairly parallel with the top surface 9 of the storage deck. An actuator 11 controls the bearers, whereby a substantially vertical movement starting from below the receiving deck is achieved to take the superimposed wood piece and move it towards the storage deck. This is described in greater detail with reference to FIGS. 6 and 7 below.

Naturally, it is also possible to provide the control means 8 with a substantially vertical outer surface. In that case, however, an acute angle forms above the bearers in relation to the outer surface of the control means to ensure that the wood pieces stay on the bearers during lifting.

The receiving deck 6 often carries more than one wood piece 5 and therefore it is fairly likely that at the beginning of the lifting several wood pieces also end up on the bearers 10. However, in order to convey only one wood piece at a time to the storage deck 3, the feeder 7 is provided with at least one measuring means 12 configured to control a bearer with an adjustable length; see FIGS. 6 and 7. In other words, the bearers are arranged to project from the outer surface of the control means 8 by an amount of projection that is adjustable during lifting. This is achieved by said measuring device that detects a wood piece of the largest diameter currently on the bearers and determines the projection of the bearers to a position corresponding to the diameter. The diameter measurement carried out during lifting and the subsequent control of the supports are repeated until the measurement result stabilizes. At that point, there is one wood piece at the most left on the bearers.

The bearers 10 preferably comprise nested arm portions so that an outer arm portion may be arranged to move in relation to an inner arm portion to adjust the amount of projection of the bearer from the outer surface of the control means 8. Naturally, the same result is achieved by using bearers projecting telescopically from the outer surface of the control means or bearers that may be turned towards the outer surface of the control means by a rotating motion.

Figure 6:
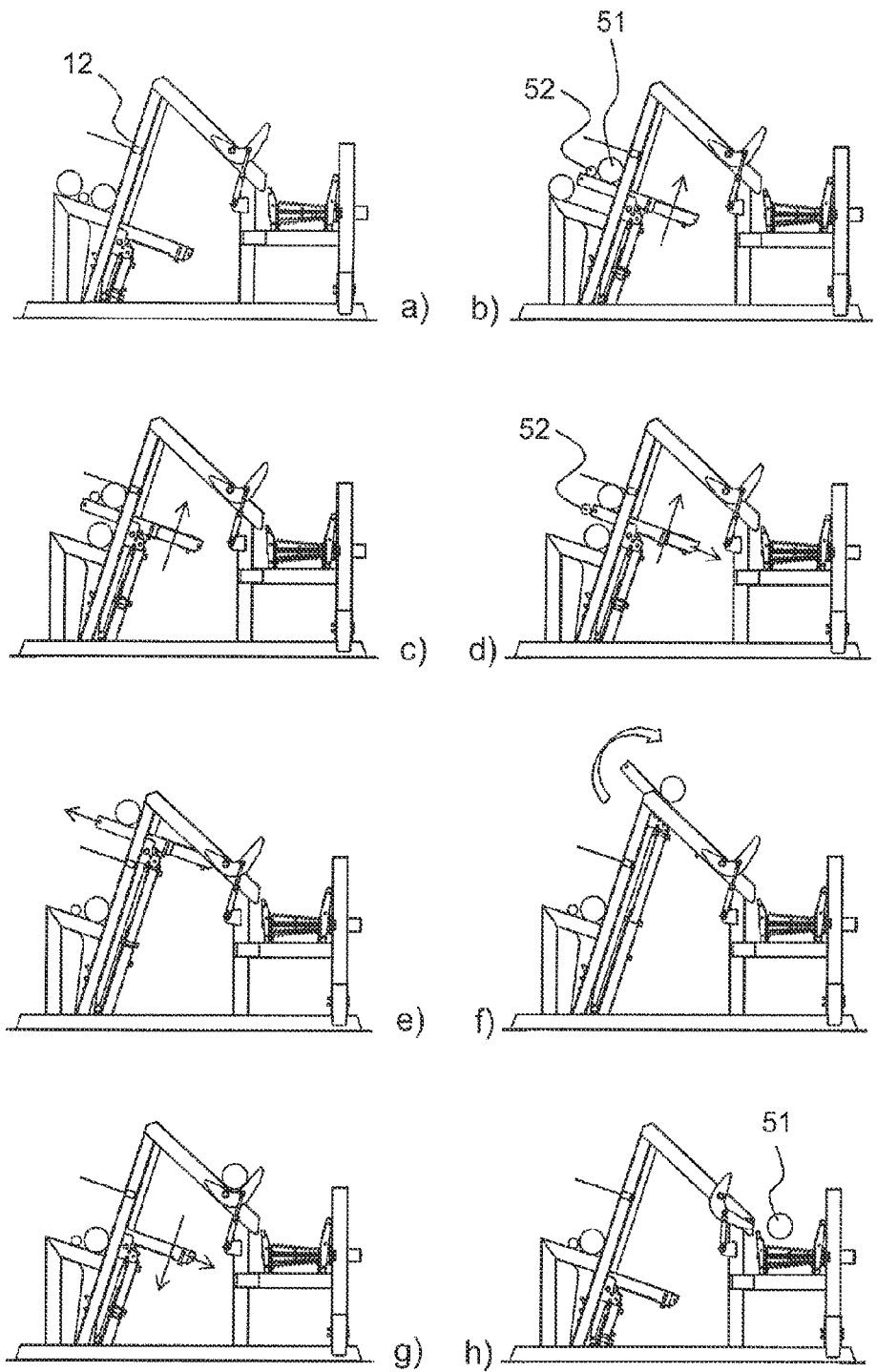
FIGS. 6 a to h illustrate the operation of a sorter when wood pieces on bearers are being handled.
Figure 7:
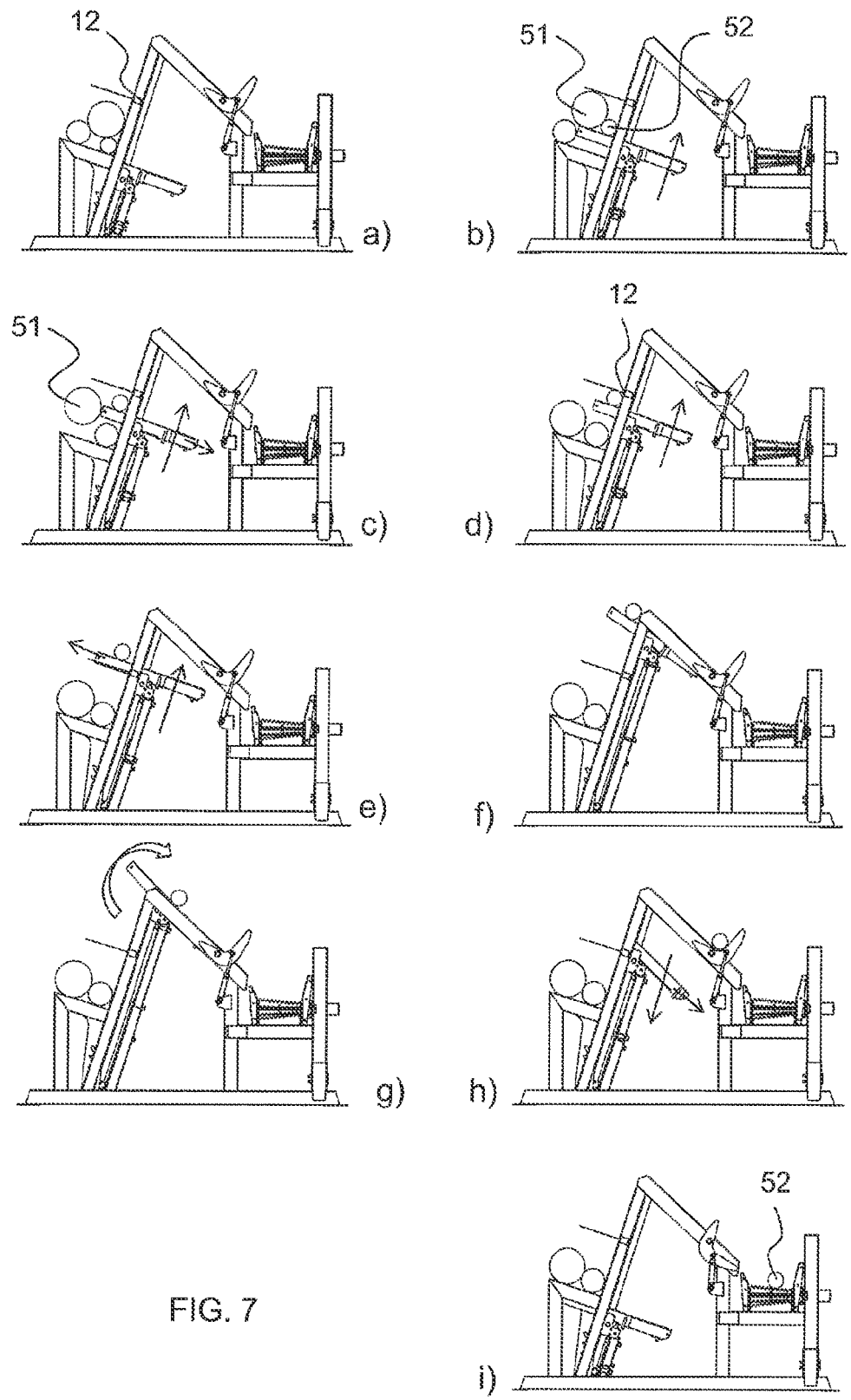
FIGS. 7 a to i illustrate an alternative operation of the sorter when wood pieces on bearers are being handled.

The measuring means 12 used in the adjusting preferably comprise means capable of contact-free detection, the measuring signal generated by the measuring means in its simplest form projecting from the outer surface as shown in FIGS. 6 and 7 of the bearer. Measuring means of this type may operate optically, using ultrasound, or in some other manner known per se. However, the measuring means may also be implemented by means capable of mechanical contact. In that case the measuring means project from the outer surface, the physical contact between the wood piece 5 and the measuring means producing the measuring signal.

The last measurement result obtained from the measuring means 12 may be separately stored into and/or transmitted to the control unit. This measurement result may then be utilized for example for further adjusting the control of the further handling of the separated wood piece 5 on the basis of its cross-sectional dimension.

The operation of the above-described arrangement is disclosed in the following with specific reference to FIGS. 6 and 7.

The wood pieces 5 are thus guided from the feeder deck to the receiving deck 6 provided in the sorter 1, in which the wood pieces are detached from the receiving deck by the sorter 7, which places the separated wood piece onto the storage deck 3 to be taken to further handling. In that case the wood piece on the feeder is supported by the control means 8 during a movement directed to it and moving it substantially vertically from the receiving deck, the transfer movement taking place along an outer surface formed on the control means.

The movement of the wood piece 5 is achieved by at least two bearers 10 entering the area defined by the receiving deck 6 and traversing the outer surface of the control means 8, the bearers guiding the wood piece into a substantially vertical movement. The movement of the bearers, in turn, is achieved by at least one actuator 11, such as a pressure-medium-operated cylinder, step motor, or a scissor device or chain lift controlled by these.

Examination of FIGS. 6a to h shows a situation in which two wood pieces 51 and 52 of different cross-sections end up from the receiving deck 6 to the bearers 10; FIGS. 6a and 6b. During the vertical movement of these wood pieces, the projection of the bearers from the outer surface of the control means 8 is adjusted by detecting first the wood piece 51 of the largest cross-section on the bearers by the measuring means 12; see FIG. 6c. In this example, the wood piece of the largest diameter is closest to the outer surface of the control means. The obtained cross-sectional measure is used for adjusting the projection of the bearers to a position corresponding to the result of the measurement. As the projection of the bearers decreases, other wood pieces 52, if any, on distal portions of the bearers fall back to the receiving deck 6; see FIG. 6d.

When the bearers 10 have passed the measuring means 12, the bearers preferably re-project to their maximum projection, thus allowing the wood piece to be conveyed without difficulties towards the storage deck; see FIG. 6d.

Bearers 10 carrying only one wood piece 51 continue their vertical movement as shown in FIG. 6e until they reach the top end of the control means 8. The bearers are then subjected to a turning motion preferably in the direction of the storage deck 3, see FIG. 6f, to enhance the transfer of the wood piece to the storage deck, where it rolls towards the conveyance means 4 as shown in FIG. 6g.

Since there is a need to regulate the entry of the wood piece 51 onto the conveyance means 4, the storage deck 3 is preferably provided with one or more feeder means 13 for at least momentarily detaining a wood piece on the storage deck. When a plural number of feeder means is used, they are arranged to the storage deck in a turning manner as shown in FIGS. 6g and 6h, for example, so that their turning motion is arranged to be substantially uniform. The storage deck may also be provided with a plural number of successive feeder means to allow one or more wood pieces to be temporarily stored at the same time on the storage deck.

When the wood piece has moved to the storage deck, the bearers are drawn in, lowered down, and a new lift cycle may begin.

However, it is possible that between the wood piece 51 of the largest diameter and the outer surface of the control means there is a wood piece 52 of a smaller diameter, as shown in FIGS. 7*a* to *i*. When the wood pieces are lifted from the receiving deck 6, the wood piece 51 of the larger diameter is thus on the distal portion of the bearers 10, as shown in FIGS. 7*a* and 7*b*. Also in that case the measuring means 12 adjusts the projection of the bearers in accordance with the larger diameter; see FIGS. 7*b* and 7*c*. Hence, it is the wood piece 51 of the largest diameter that falls onto the receiving deck, as shown in FIGS. 7*c* and 7*d*. Since the wood piece 51 measured by the first measuring event is no longer in front of the measuring means, the measuring means will make a new measurement, as shown in FIG. 7*d*, and a subsequent adjustment as the wood piece 52 of the next largest diameter enters the measuring range. The measuring cycle and the adjustment of the projection of the bearers 10 will be repeated until there is only one wood piece 52 left on the bearers; FIG. 7*e*.

Next, bearers 10 carrying only one wood piece 52 reproject and continue their vertical movement as disclosed above, taking the wood piece to the storage deck 3 and further through the feeder means 13 to the conveyance means 4; see FIGS. 7*f* to 7*i*.

If the bearers 10 reach their maximum lifting height although the measuring means 12 have not made any detection, the situation is interpreted to mean that the wood piece has fallen from the bearers. In that case the bearers are immediately retracted, lowered down, and a new lift cycle begins.

The measuring means 12 above the receiving deck 6 may also be used for actively monitoring the measured difference provided by adjacent measuring means. If the wood pieces 5 are in a disadvantageous diagonal position, for example, on the receiving deck, the use of the sorter may lead to a situation in which one bearer 10 lifts one end of a wood piece of a large diameter on the receiving deck while another bearer lifts one end of a thinner wood piece also on the receiving deck. In that case the significant difference in the dimensions detected by the measuring means will control the bearers to drop both the wood pieces and start a new lift cycle. Also in a case where there are no wood pieces on one of the bearers, the bearers are controlled to drop a wood piece, if any, on the other bearer. Failed lift attempts on three lift cycles, for example, will cause the system to raise an alarm.

The operator of the sorter 1 may also determine the maximum size of the wood piece 5 handled by the sorter. When such a predetermined maximum dimension is exceeded, the measuring means 12 control the bearers 10 to remove the wood piece and to raise an alarm to the operator.

It is also possible that a wood piece of a large diameter on the bearers 10 leans against the control means 8 of the sorter 1 and carries on top of it another wood piece of a smaller diameter that also leans against the control means. In that case the top surface of the wood piece of the smaller diameter will be higher up than the top surface of the large wood piece underneath. As in this case the measurement made by the measuring means 12 will be directed to the surface of the smaller wood piece on top of the large wood piece and the bearers are controlled to become adjusted according to this erroneous measurement result, neither wood piece falls. Error situations such as these may be mostly avoided by using the above-disclosed method of interrupting the lift cycle caused by the maximum diameter of the wood piece.

One way of avoiding the situation disclosed above in which there are wood pieces 5 one on top of the other on the bearers 10 but the maximum size determined for a wood piece is not exceeded would be to perform a kind of mixing action on the bearers at the beginning of the lift cycle. Consequently, when the bearers begin their substantially vertical movement, the wood pieces are first lifted off from the receiving deck 6. The bearers, which at the beginning of the lift are at their outermost position, are first slightly retracted towards the control means 8 and then guided again to their substantially outermost position. The alternating movement of the bearers thus efficiently detaches any superimposed wood pieces.

It will be apparent to a person skilled in the art that as technology advances, the basic idea of the disclosure may be implemented in many different ways. The disclosure and its embodiments are thus not restricted to the examples described above but may vary within the scope of the claims.

I claim:

1. An apparatus comprising:
    a sorter to guide wood pieces to a conveyor, the sorter including:
        a lower frame to solidly mount the sorter against a base;
        a receiving deck for wood pieces;
        a feeder to detach a wood piece from the receiving deck;
        a controller to support the wood piece during movement directed to the wood piece and to transfer the wood piece substantially vertically from the receiving deck; and
        an outer surface formed to the controller and traversed by at least two bearers that are arranged under the wood piece, project into an area defined by the receiving deck, and generate a vertical movement of the wood piece;
    the bearers being controlled by at least one actuator and comprising nested arm portions that include an outer arm portion and an inner arm portion,
    wherein
        the bearers are arranged to initially project from the outer surface of the controller by an amount of projection prior to lifting,
        the feeder further comprises a measuring device for detecting a wood piece of a given diameter on the bearers, and
        the amount of projection is adjusted during lifting to a position corresponding to the given diameter detected by the measuring device by retracting the bearers along a substantially horizontal plane.

2. The apparatus of claim 1, wherein the outer surface of the controller forms an angle of 10 to 30 degrees diverting from the receiving deck in relation to a vertical deck.

3. The apparatus of claim 1, wherein the outer surface of the controller forms an angle of 15 to 25 degrees diverting from the receiving deck in relation to a vertical deck.

4. The apparatus of claim 1, wherein the outer surface of the controller forms an angle 15 to 20 degrees diverting from the receiving deck in relation to a vertical deck.

5. The apparatus of claim 1, wherein the controller includes at least two substantially parallel beams, the side surface decks of the beams forming part of the outer surface.

6. The apparatus of claim 1, wherein the receiving deck forms a part of a device substantially projecting from the controller, the edge of the device on the side of the controller being lower than the edge facing away from the controller.

7. The apparatus of claim 1, wherein the measuring device is able to perform contact-free detection of the given diameter of the wood piece.

8. The apparatus of claim 7, wherein the measuring device produces an optical measuring signal that projects from the controller substantially parallel with the bearers.

9. The apparatus of claim 1, wherein the measuring device includes a mechanical contact.

10. The apparatus of claim 9, wherein the measuring device projects from the outer surface of the controller substantially parallel with the bearers, and wherein a measuring signal is generated by a contact between the wood piece and the mechanical contact of the measuring device.

11. The apparatus of claim 1, wherein the sorter includes a storage deck that guides the wood piece to further handling, the storage deck which, in turn, is provided with a feeding unit for at least momentarily retaining the wood piece on the storage deck.

12. The apparatus of claim 11, wherein the feeding unit is pivotally arranged to the storage deck, and wherein the turning motion is arranged to take place in a substantially uniform manner.

13. The apparatus of claim 11, wherein the sorter includes a conveyor attached thereto that guides wood pieces conveyed from the storage deck by the feeding unit to further handling.

14. A method for sorting wood pieces and for guiding them to a conveyor, the method comprising:
    guiding the wood pieces to a receiving deck on a sorter;
    detaching a wood piece from the receiving deck by a feeder;
    supporting the wood piece on the feeder by a controller during a movement directed to the wood piece;
    transferring the wood piece substantially vertically from the receiving deck by the controller, the transfer taking place along an outer surface formed to the controller;
    guiding the wood piece by at least two bearers that are arranged under the wood piece, project into an area defined by the receiving deck, and traverse the outer surface while providing a vertical movement of the wood piece, the bearers being controlled by at least one actuator and comprising nested arm portions that include an outer arm portion and an inner arm portion;
    detecting, by a measuring device, a wood piece of a largest cross-sectional diameter on the bearers; and
    adjusting projection of the bearers during lifting to a position corresponding to the largest cross-sectional diameter detected by the measuring device by retracting the bearers along a substantially horizontal plane.

15. The method of claim 14, wherein the bearers are initially positioned at a maximum projected length and adjustment of the projection results in a decrease in projected length.

16. The method of claim 14, further comprising:
    repeating detection of the largest cross-sectional diameter carried out during lifting and the subsequent adjustment of the bearers until the cross-sectional diameter and the projected position stabilize.

17. The method of claim 16, wherein the last cross-sectional diameter measurement obtained from the measuring device is stored and transmitted to a control unit for controlling the forwarding of the corresponding wood piece.

18. A system for guiding wood pieces, the system comprising:
    sorter means for guiding wood pieces to a conveyor means, the sorter means including:
        lower frame means for solidly mounting the sorter means against a base;
        receiving deck means for wood pieces;
        feeder detaching means for detaching a wood piece from the receiving deck means;
        control means for supporting the wood piece during movement directed to the wood piece and for transferring the wood piece substantially vertically from the receiving deck means, where the control means is coupled to an outer surface, the outer surface being traversed by bearing means that are arranged to project into an area defined by the receiving deck and generate a vertical movement of the wood piece;
    the bearing means being controlled by at least one actuator and comprising nested arm portions that include an outer arm portion and an inner arm portion,
    wherein the bearing means are arranged to initially project from the outer surface of the control means by an amount of projection prior to lifting,
    wherein the amount of projection is adjusted during lifting to a position corresponding to a given cross-sectional diameter of a given wood piece detected by measuring means, and
    wherein the amount of projection is adjusted by retracting the bearing means along a substantially horizontal plane.

19. The system of claim 18, wherein the feeder detaching means comprises the measuring means for detecting the given wood piece having the given cross-sectional diameter on the bearing means and for controlling the adjustment of the bearing means to the position corresponding to the given cross-sectional diameter.

* * * * *